US010844145B2

(12) United States Patent
Meier et al.

(10) Patent No.: US 10,844,145 B2
(45) Date of Patent: Nov. 24, 2020

(54) METHOD FOR PRODUCING AN ELECTRODE MATERIAL

(71) Applicant: Evonik Operations GmbH, Essen (DE)

(72) Inventors: Christian Meier, Darmstadt (DE); Christine Miess, Aschaffenburg (DE); Michael Korell, Bochum (DE); Malin Kummer, Kevelaer (DE); Günter Schmitt, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 226 days.

(21) Appl. No.: 16/301,810

(22) PCT Filed: May 22, 2017

(86) PCT No.: PCT/EP2017/062285
§ 371 (c)(1),
(2) Date: Nov. 15, 2018

(87) PCT Pub. No.: WO2017/207325
PCT Pub. Date: Dec. 7, 2017

(65) Prior Publication Data
US 2019/0177445 A1    Jun. 13, 2019

(30) Foreign Application Priority Data

Jun. 2, 2016  (EP) ..................... 16172593

(51) Int. Cl.
| | | |
|---|---|---|
| C08F 220/34 | (2006.01) | |
| H01M 10/0525 | (2010.01) | |
| C08F 2/16 | (2006.01) | |
| C08F 2/26 | (2006.01) | |
| C08F 8/06 | (2006.01) | |
| C08F 2/18 | (2006.01) | |
| C08F 2/44 | (2006.01) | |
| H01M 4/60 | (2006.01) | |
| C08F 4/40 | (2006.01) | |
| H01M 4/04 | (2006.01) | |

(52) U.S. Cl.
CPC ............... *C08F 2/16* (2013.01); *C08F 2/18* (2013.01); *C08F 2/26* (2013.01); *C08F 2/44* (2013.01); *C08F 4/40* (2013.01); *C08F 8/06* (2013.01); *H01M 4/0466* (2013.01); *H01M 4/608* (2013.01); *H01M 10/0525* (2013.01)

(58) Field of Classification Search
CPC .. C08F 220/34; C08F 2/16; C08F 2/18; C08F 2/26
See application file for complete search history.

(56) References Cited

U.S. PATENT DOCUMENTS

| | | | |
|---|---|---|---|
| 4,276,401 A * | 6/1981 | Karrer | .................. C07D 211/46 |
| | | | 526/259 |
| 4,933,394 A | 6/1990 | Foos | |
| 4,999,263 A | 3/1991 | Kabata et al. | |
| 5,416,215 A | 5/1995 | Büschken et al. | |
| 7,351,867 B2 | 4/2008 | Tanielyan et al. | |
| 9,276,292 B1 | 3/2016 | MacKenzie et al. | |
| 9,397,341 B2 | 7/2016 | Lockett et al. | |
| 9,520,598 B2 | 12/2016 | Lockett et al. | |
| 9,666,380 B1 | 5/2017 | Lai et al. | |
| 9,732,200 B2 | 8/2017 | Angel et al. | |
| 9,891,230 B2 | 2/2018 | Haeupler et al. | |
| 10,103,384 B2 | 10/2018 | Haeupler et al. | |
| 2002/0041995 A1 | 4/2002 | Bannai et al. | |
| 2002/0041996 A1 | 4/2002 | Morioka et al. | |
| 2003/0062080 A1 | 4/2003 | Satoh et al. | |
| 2003/0096165 A1 | 5/2003 | Nakahara et al. | |
| 2003/0157023 A1 | 8/2003 | Roessling et al. | |
| 2004/0115529 A1 | 6/2004 | Nakahara et al. | |
| 2005/0170247 A1 | 8/2005 | Nakahara et al. | |
| 2005/0260500 A1 | 11/2005 | Iwasa et al. | |
| 2007/0078284 A1 | 4/2007 | Tanielyan et al. | |
| 2008/0038636 A1 | 2/2008 | Suguro et al. | |
| 2008/0171265 A1 | 7/2008 | Iriyama et al. | |
| 2008/0213669 A1 | 9/2008 | Nakahara et al. | |
| 2008/0226986 A1 | 9/2008 | Nakahara et al. | |
| 2008/0297350 A1 | 12/2008 | Iwasa et al. | |
| 2009/0156706 A1 | 6/2009 | Rolfe et al. | |
| 2009/0306304 A1 | 12/2009 | Fujimoto et al. | |
| 2010/0167129 A1 | 7/2010 | Wu et al. | |
| 2010/0168360 A1 | 7/2010 | Fujimoto | |
| 2010/0233537 A1 | 9/2010 | Nesvadba et al. | |
| 2010/0255372 A1 | 10/2010 | Suguro et al. | |
| 2011/0006294 A1 | 1/2011 | Tanaka et al. | |
| 2011/0033532 A1 | 2/2011 | Angel et al. | |
| 2011/0129730 A1 | 6/2011 | Kasai et al. | |
| 2012/0095179 A1 | 4/2012 | Nishide et al. | |
| 2012/0100437 A1 | 4/2012 | Nakahara et al. | |
| 2012/0171561 A1 | 7/2012 | Iwasa et al. | |
| 2012/0187387 A1 | 7/2012 | Sekiguchi et al. | |
| 2013/0183782 A1 | 7/2013 | Mima | |
| 2013/0189571 A1 | 7/2013 | Abouimrane et al. | |

(Continued)

FOREIGN PATENT DOCUMENTS

| | | |
|---|---|---|
| CN | 101401234 | 4/2009 |
| CN | 101484477 | 7/2009 |

(Continued)

OTHER PUBLICATIONS

Translation of the ISA/237 (no date).*

(Continued)

Primary Examiner — Amanda C. Walke
(74) Attorney, Agent, or Firm — Grüneberg and Myers PLLC

(57) ABSTRACT

The present invention relates to a process for polymerization, wherein the monomers are used in the form of solid particles in an aqueous phase. The polymers obtained thereby can be oxidized further to polymers which can be used as electrical charge storage means, especially secondary batteries.

18 Claims, No Drawings

(56) References Cited

U.S. PATENT DOCUMENTS

| | | | |
|---|---|---|---|
| 2013/0209878 A1 | 8/2013 | Nakahara et al. | |
| 2014/0038036 A1 | 2/2014 | Nishide et al. | |
| 2014/0048786 A1 | 2/2014 | Suzuka et al. | |
| 2014/0057167 A1 | 2/2014 | Kasai et al. | |
| 2014/0061532 A1 | 3/2014 | Nishide et al. | |
| 2014/0079984 A1 | 3/2014 | Kajitani et al. | |
| 2014/0087235 A1 | 3/2014 | Kajitani et al. | |
| 2015/0004113 A1 | 1/2015 | Ritter et al. | |
| 2016/0211048 A1 | 7/2016 | Vlad et al. | |
| 2016/0218354 A1 | 7/2016 | Vlad et al. | |
| 2016/0233509 A1 | 8/2016 | Haeupler et al. | |
| 2016/0297911 A1* | 10/2016 | Niitani | C08L 33/14 |
| 2017/0058062 A1 | 3/2017 | Schubert et al. | |
| 2017/0062825 A1 | 3/2017 | Schubert et al. | |
| 2017/0114162 A1 | 4/2017 | Haeupler et al. | |
| 2017/0162862 A1 | 6/2017 | Thielen et al. | |
| 2017/0179525 A1 | 6/2017 | Haeupler et al. | |
| 2017/0222232 A1 | 8/2017 | Lockett et al. | |
| 2018/0102541 A1 | 4/2018 | Schubert et al. | |
| 2018/0108911 A1 | 4/2018 | Schubert et al. | |

FOREIGN PATENT DOCUMENTS

| | | |
|---|---|---|
| CN | 101583635 | 11/2009 |
| CN | 101632198 | 1/2010 |
| CN | 104277227 | 1/2015 |
| DE | 100 13 850 | 9/2011 |
| EP | 0 231 878 | 8/1987 |
| EP | 0 373 633 | 6/1990 |
| EP | 1 128 453 | 8/2001 |
| EP | 1 381 100 | 1/2004 |
| EP | 1 752 474 | 2/2007 |
| EP | 1 911 775 | 4/2008 |
| EP | 2 042 523 | 4/2009 |
| EP | 3 279 223 | 2/2018 |
| JP | H08-3136 | 1/1996 |
| JP | 3222625 | 10/2001 |
| JP | 2002-117852 | 4/2002 |
| JP | 2002-117854 | 4/2002 |
| JP | 2002-117855 | 4/2002 |
| JP | 2002-298850 | 10/2002 |
| JP | 2002-313344 | 10/2002 |
| JP | 2004-179169 | 6/2004 |
| JP | 2004-200059 | 7/2004 |
| JP | 2004-259618 | 9/2004 |
| JP | 2005-8689 | 1/2005 |
| JP | 2005-11562 | 1/2005 |
| JP | 2005-209498 | 8/2005 |
| JP | 2005-228705 | 8/2005 |
| JP | 2005-228712 | 8/2005 |
| JP | 2006-22177 | 1/2006 |
| JP | 2006-252917 | 9/2006 |
| JP | 2007-157388 | 6/2007 |
| JP | 2007-157496 | 6/2007 |
| JP | 2007-165054 | 6/2007 |
| JP | 2007-227147 | 9/2007 |
| JP | 2007-236142 | 9/2007 |
| JP | 2008-218326 | 9/2007 |
| JP | 2008-81557 | 4/2008 |
| JP | 2008-88330 | 4/2008 |
| JP | 2008081557 A * | 4/2008 |
| JP | 2008-101037 | 5/2008 |
| JP | 2008-123816 | 5/2008 |
| JP | 2008-154925 | 7/2008 |
| JP | 2008-159526 | 7/2008 |
| JP | 2008-175725 | 7/2008 |
| JP | 2008-192452 | 8/2008 |
| JP | 2008-214310 | 9/2008 |
| JP | 2008-234909 | 10/2008 |
| JP | 2008-280401 | 11/2008 |
| JP | 2009-13093 | 1/2009 |
| JP | 2009-104374 | 5/2009 |
| JP | 2009-104819 | 5/2009 |
| JP | 2009-126869 | 6/2009 |
| JP | 2009-135010 | 6/2009 |
| JP | 2009-140647 | 6/2009 |
| JP | 2009-205918 | 9/2009 |
| JP | 2009-230951 | 10/2009 |
| JP | 2009-238612 | 10/2009 |
| JP | 2009-1725 | 11/2009 |
| JP | 2009-298873 | 12/2009 |
| JP | 2010-114042 | 5/2010 |
| JP | 2010-163551 | 7/2010 |
| JP | 2010-180285 | 8/2010 |
| JP | 2010-185071 | 8/2010 |
| JP | 2010-238403 | 10/2010 |
| JP | 2011-23333 | 2/2011 |
| JP | 2011-46764 | 3/2011 |
| JP | 2011-74317 | 4/2011 |
| JP | 2011-165433 | 8/2011 |
| JP | 2011-252106 | 12/2011 |
| JP | 2012-28018 | 2/2012 |
| JP | 2012-79639 | 4/2012 |
| JP | 2012-193273 | 10/2012 |
| JP | 2012-219109 | 11/2012 |
| JP | 2012-221574 | 11/2012 |
| JP | 2012-221575 | 11/2012 |
| JP | 2013-87256 | 5/2013 |
| JP | 2013-155267 | 8/2013 |
| JP | 2013-184981 | 9/2013 |
| JP | 5384130 | 10/2013 |
| RU | 2 114 830 | 7/1998 |
| WO | 95/04089 | 2/1995 |
| WO | 2004/077593 | 9/2004 |
| WO | 2005/078830 | 8/2005 |
| WO | 2005/078831 | 8/2005 |
| WO | 2006/082708 | 8/2006 |
| WO | 2007/066624 | 6/2007 |
| WO | 2007/115939 | 10/2007 |
| WO | 2007/141913 | 12/2007 |
| WO | 2008/099557 | 8/2008 |
| WO | 2009/016258 | 2/2009 |
| WO | 2009/038125 | 3/2009 |
| WO | 2009/145225 | 12/2009 |
| WO | 2010/002002 | 1/2010 |
| WO | 2010/104002 | 9/2010 |
| WO | 2010/140512 | 9/2010 |
| WO | 2011/034117 | 3/2011 |
| WO | 2012/029556 | 3/2012 |
| WO | 2012/120929 | 9/2012 |
| WO | 2012/133202 | 10/2012 |
| WO | 2012/133204 | 10/2012 |
| WO | 2012/153865 | 11/2012 |
| WO | 2012/153866 | 11/2012 |
| WO | 2013/099567 | 7/2013 |
| WO | 2015/032950 | 3/2015 |
| WO | 2015/032951 | 3/2015 |
| WO | 2017/220965 | 12/2017 |
| WO | 2018/024901 | 2/2018 |
| WO | 2018/046387 | 3/2018 |

OTHER PUBLICATIONS

Machine Translation of JP 2008-081557 (no date).*
Zhou et al, "Studies on the Polymerizzation of 2,2,6,6,-tetramethyl piperindinyl methacrylate", Journal of Polymer Communications, vol. 2, pp. 96-102 (1985). (Year: 1985).*
Tang et al, Novel high TEMPO loading magneto-polymeric nanohybrids: An efficient and recyclable Pickering interfacial catalyst, Journal of Catalysis, 353, 192-198 (2017). (Year: 2017).*
Yoshida et al, $CO_2$-responsive behavior of polymer giant vesicles supporting hindered amine, Colloid and Polymer Science, 297, 661-666 (2019). (Year: 2019).*
Translation of the PCT-237 from PCT/JP2005/009893 (PCT of EP1752474 cited on the 237 of the instant application) (no date).*
Bales et al., Journal of Physical Chemistry A; 2009, 113(33):9295-9303.
Sinha et al., Journal of Medicinal Chemistry; 1975, 18(7):669-673.
International Search Report dated Jun. 30, 2017 in PCT/EP2017/062285.
Written Opinion dated Jun. 30, 2017 in PCT/EP2017/062285.

(56) References Cited

OTHER PUBLICATIONS

Bugnon, et al., "*Synthesis of Poly(4-methacryloyloxy-TEMPO) via Group-Transfer Polymerization and Its Evaluation in Organic Radical Battery*," Chem, Mater. 2007, 19, 2910-2914.
Crayston, et al., (1993) "*Polyradicals: Synthetic Strategies and Characterization*," Molecular Crystals and Liquid Crystals Science and Technology. Section A. Molecular Crystals and Liquid Crystals, 236:1, 231-235, 8 pages, DOI: 10.1080/10587259308055233.
Hashimoto et al., "*Development of a Clean Oxidation Method of Producing Functional Chemicals Using Hydrogen Peroxide as an Oxidizing Reagent*," Sumitomo Seika Chemicals Co., Ltd., vol. 57 No. 5 2015, with translation, 18 pages.
Hopff et al., "*Über 2-Vinylthiantren und seine Polymerisationsprodukte*,", Aus dem Technisch-Chemischen Laboratorium der Eidgenössischen Technischen Hochschule Zürich, Dec. 10, 1962, with translation, 24 pages.
Janoschka, et al., "*Stromspeicher: Radikal organisch*," Nachrichten aus der Chemi, 60, Jul./Aug. 2012, with translation, 11 pages.
Kamachi et al., "*Electron Exchange Phenomena of Polymers Containing Nitroxyl Radicals*," Polymer Journal, vol. 14, No. 5, pp. 363-369 (1982).
Kim et al., "*Effect of radical polymer cathode thickness on the electrochemical performance of organic radical battery*," Solid State Ionics 178 (2007) 1546-1551 (8 pages).
Kurosaki et al., "*Polymers Having Stable Radicals. II. Synthesis of Nitroxyl Polymers from 4-Methacryloyl Derivatives of 1-Hydroxy-2,2,6,6- tetramethylpiperidine*," Journal of Polymer Science: Polymer Chemistry Edition, vol. 12, 1407-1420 (1974).
Kurosaki et al., "*Polymers Having Stable Radicals, I. Synthesis of Nitroxyl Polymers from 4-Methacryloyl Derivatives of 2,2,6,6-Tetramethylpiperidine*," Journal of Polymer Science: Polymer Chemistry Edition, vol. 10. 3295-3310 (1972).
MacCorquodale et al., "*Synthesis and Electrochemical Characterisation of Poly(Tempo-Acrylate)*," Tetrahedron Letters, vol. 31, No, 5, pp. 771-774, 1990.
Muench et al., "*Polymer-Based Organic Batteries*," ACS Publications, Chem. Rev. 2016, 116, 9438-9484 DOI: 10.1021/acs.chemrev.6b00070.
Nakahara et al., "*Rechargeable batteries with organic radical cathodes*,", Chemical Physics Letters 359 (2002) 351-354.
Nesvadba et al., "*Synthesis of a polymeric 2,5-di-t-butyl-1, 4-dialkoxybenzene and its evaluation as a novel cathode material*," Synthetic Metals 161 (2011) 259-262 doi:10.1016/j.synthmet.2010.11.030.
Tetsuo Osa, "*New Challenges in Organic Electrochemistry*," 1998, Gordon and Breach Science Publishers, 38 pages.
Park et al., "*Synthesis and Dispersion Characteristics of Multi-Walled Carbon Nanotube Composites with Poly(methyl methacrylate) Prepared by In-Situ Bulk Polymerization*," Macromol. Rapid Commun. 2003, 24, No. 18, 1070-1073 DOI: 10.1002/marc.200300089.
Schmidt et al., "*Poly[N-(10-oxo-2-vinylanthracen-9(10H)-ylidene)cyanamide] as a Novel Cathode Material for Li-Organic Batteries*," Journal of Polymer Science, art A: Polymer Chemistry 2015, 53, 2517-2523.
Suga et al., "*Emerging N-Tpe Redox-Active Radical Polymer for a Totally Organic Polymer-Based Rechargeable Battery*," Adv. Mater. 2009, 21, 1627-1630 DOI: 10.1002/adma.200803073.
Suga et al., "*p- and n-Type Bipolar Redox-Active Radical Polymer: Toward Totally Organic Polymer-Based Rechargeable Devices with Variable Configuration*," Adv. Mater. 2011, 23, 751-754 DOI: 10.1002/adma.201003525.
Vlad, et al. "*Melt-Polymerization of TEMPO Methacrylates with Nano Carbons Enables Superior Battery Materials*," ChemSusChem 2015, 8, 1692-1696 DOI: 10.1002/cssc.201500246.
Liang Wenzhong, "*Effect of Structure of Polymeric Hindered Amines on the Oxidation of Polymers: Part 1-Syntheses of Polymeric Hindered Piperidyl Esters*," Polymer Degradation and Stability 31 (1991) 353-364.
Wenzhong et al., "*Purification and characterization of 4-methacryloyloxy-2,2,6,6-tetramethylpiperidine*," (Institute of Chemistry, Chinese Academy of Sciences), 1981, Issue 5, with English translation (8 pages). DOI:10.13822 /j.cnki.hxsj.1981.05.008.
U.S. Pat. No. 10,103,384, filed Oct. 16, 2018, Publication No. 2019/0233509, Inventor Haeupler et al.
U.S. Pat. No. 9,890,230, filed Feb. 13, 2018, Publication No. 2017/0114162, Inventor Haeupler et al.
U.S. Appl. No. 15/129,910, filed Sep. 28, 2016, Publication No. 2017/0179525, Haeupler et al.
U.S. Appl. No. 15/568,884, filed Oct. 24, 2017, Publication No. 2018/0108911, Inventor Schubert et al.
U.S. Appl. No. 15/247,434, filed Aug. 25, 2016, Publication No. 2017/0058062, Inventor Schubert et al.
U.S. Appl. No. 15/247,346, filed Aug. 25, 2016, Publication No. 2017/0062825, Inventor Schubert et al.
U.S. Appl. No. 15/568,871, filed Oct. 24, 2017, Publication No. 2018/0102541, Inventor Schubert et al.

* cited by examiner

METHOD FOR PRODUCING AN ELECTRODE MATERIAL

This application is a National Stage entry under § 371 of International Application No. PCT/EP2017/062285, filed on May 22, 2017, and claims priority to European Patent Application No. 16172593,2, filed on Jun. 2, 2016, the entire contents of which are hereby incorporated as reference.

The present invention relates to a process for polymerization, wherein the monomers are used in the form of solid particles in an aqueous phase. The polymers obtained thereby can be oxidized further to polymers which can be used as electrical charge storage means, especially secondary batteries.

BACKGROUND OF THE INVENTION

Organic batteries are electrochemical cells which use an organic charge storage material as active electrode material for storing electrical charge. These secondary batteries are notable for their exceptional properties, such as fast chargeability, long lifetime, low weight, high flexibility and ease of processibility. Active electrode materials which have been described for charge storage in the prior art are various polymeric structures, for example polymeric compounds having organic nitroxide radicals as active units (for example in WO 2012/133202 A1, WO 2012/133204 A1, WO 2012/120929 A1, WO 2012/153866 A1, WO 2012/153865 A1, JP 2012-221574 A, JP 2012-221575 A, JP 2012-219109 A, JP 2012-079639 A, WO 2012/029556 A1, WO 2012/153865 A1, JP 2011-252106 A, JP 2011-074317 A, JP 2011-165433 A, WO 2011034117 A1, WO 2010/140512 A1, WO 2010/104002 A1, JP 2010-238403 A, JP 2010-163551 A, JP 2010-114042 A, WO 2010/002002 A1, WO 2009/038125 A1, JP 2009-298873 A, WO 2004/077593 A1, WO 2009/145225 A1, JP 2009-238612 A, JP 2009-230951 A, JP 2009-205918 A, JP 2008-234909 A, JP 2008-218326 A, WO 2008/099557 A1, WO 2007/141913 A1, US 2002/0041995 A1, EP 1128453 A2; A. Vlad, J. Rolland, G. Hauffman, B. Ernould, J.-F. Gohy, ChemSusChem 2015, 8, 1692-1696) or polymeric compounds having organic phenoxyl radicals or galvinoxyl radicals as active units (for example US 2002/0041995 A1, JP 2002-117852 A).

Particular emphasis should be given here to poly(2,2,6,6-tetramethylpiperidinyloxymethacrylate), the synthesis of which is described by K. Nakahara, S. Iwasa, M. Satoh, Y. Morioka, J. Iriyama, M. Suguro, E. Hasegawa, Chem Phys Lett 2002, 359, 351-354 and J. Kim, G. Cheruvally, J. Choi, J. Ahn, S. Lee, S. Choi, C. Song, Solid State Ionics 2007, 178, 1546-1551. Further synthesis methods are described in the following publications: WO 2015/032951 A1, EP 1 752 474 A1, EP 1 911 775 A1, EP 2 042 523 A1. Particular emphasis should be given to EP 1 752 474 A1, which describes a process for polymerizing 2,2,6,6-tetramethylpiperidinyloxymethacrylate as an "emulsion polymerization", i.e. in the form of homogeneous mixtures of the monomers in water. However, the process described in this document has some disadvantages. Specifically, it was observed that, particularly in the case of larger batches as required on the industrial scale, the polymers obtained by the process described in this document can be worked up only with difficulty. However, particularly in the production of organic charge storage material, the latter should ideally be in finely divided form. With the processes described in the prior art, however, the polymers are obtained in the form of coagulate, which necessitates an additional comminution step. It is therefore desirable, particularly in the case of industrial scale production, to dispense with this comminution step and to obtain finely divided polymer which can be worked up easily directly after the polymerization step.

The problem addressed by the present invention was therefore that of providing an improved process for producing organic polymers usable in secondary batteries, which has the particular feature that the polymers obtained can be more easily worked up.

A process which solves the aforementioned problem has now surprisingly been found.

DETAILED DESCRIPTION OF THE INVENTION

The present invention accordingly relates to a process for polymerizing a compound of the structural formula (I)

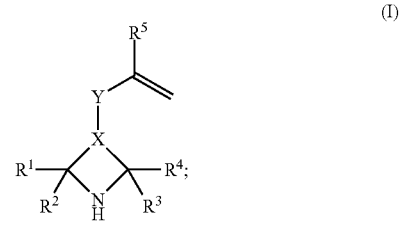

where $R^1$, $R^2$, $R^3$, $R^4$, $R^5$ are selected from the group consisting of hydrogen, branched or unbranched alkyl group having 1 to 4 carbon atoms, preferably where $R^1$, $R^2$, $R^3$, $R^4$ are all methyl and $R^5$=hydrogen or methyl, more preferably $R^5$=methyl, X is selected from the group consisting of *—$CH_2$—C'H—$CH_2$—**, *—C'H—$CH_2$—**, *—C=CH—**, where "*" in each case denotes the bond to the carbon atom bonded to $R^1$ and $R^2$, where "**" in each case denotes the bond to the carbon atom bonded to $R^3$ and $R^4$, where "C'" denotes the bond to a carbon atom additionally bonded to the Y radical, where Y is selected from the bridging radicals (II) and (III), where (II) has the structure &—$(Y^1)_{p1}$—$[C=X^1]_{p2}$—$(Y^2)_{p3}$—B—$(Y^3)_{p6}$—$[C=X^2]_{p5}$—$(Y^4)_{p4}$—&&, and where (III) has the structure &—$(Y^5)_{p9}$—$(C=X^3)_{p8}$—$(Y^6)_{p7}$—&&, where, in the bridging radicals (II) and (III), p1, p2, p3 are each 0 or 1, with the proviso that it is not simultaneously the case that p1=p3=1 and p2=0, p4, p5, p6 are each 0 or 1, with the proviso that it is not simultaneously the case that p4=p6=1 and p5=0, p7, p8, p9 are each 0 or 1, with the proviso that it is not simultaneously the case that p7=p9=1 and p8=0, $X^1$, $X^2$, $X^3$ are independently selected from the group consisting of oxygen, sulphur, $Y^1$, $Y^2$, $Y^3$, $Y^4$, $Y^5$, $Y^6$ are independently selected from the group consisting of O, S, NH, N-alkyl, B is a divalent (hetero)aromatic radical or a divalent aliphatic radical optionally substituted by at least one group selected from nitro group, —$NH_2$, —CN, —SH, —OH, halogen, and optionally having at least one group selected from ether, thioether, amino ether, carbonyl group, carboxylic ester group, carboxamide group, sulphonic ester group, phosphoric ester, and where "&&" for Y denotes the bond via which Y is joined to X and where "&" for Y denotes the bond via which Y is joined to the carbon atom joined to $R^5$, comprising the following successive steps:
(a) producing a dispersion D of solid particles of the compound of the structural formula (I) in an aqueous phase,
(b) polymerizing the solid particles of the compound of the structural formula (I) of the dispersion D obtained in step (a), giving a polymer $P^1$ comprising repeat units of the structural formula (VI)

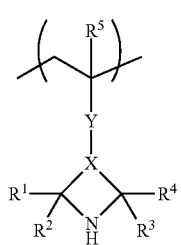

(VI)

characterized in that
the polymerization in step b) is conducted at a temperature below the melting temperature of the compound of the structural formula (I) used.

The number of repeat units (VI) in the polymer $P^1$ is preferably 4 to 1 million, more preferably 10 to 100 000, even more preferably 20 to 5000.

More particularly, the compound of the structural formula (I) used in the process according to the invention is one of the following compounds of the structural formulae (IV), (IV)', (IV)", preferably a compound of the structural formula (IV):

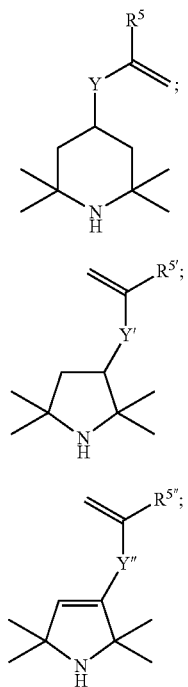

(IV)

(IV')

(IV")

where, in the structural formulae (IV), (IV)', (IV)", the $R^5$, $R^{5'}$, $R^{5''}$ radicals are each independently methyl or hydrogen, preferably methyl, and where, in the structural formulae (IV), (IV)', (IV)", the Y, Y', Y" radicals are independently selected from the bridging radicals (II) and (III) with the definitions given further up.

Even more preferably, in the structural formulae (IV), (IV)', (IV)", the Y, Y', Y" radicals are independently selected from the bridging radicals (II) and (III), where (II) has the structure &—$(Y^1)_{p1}$—$[C=X^1]_{p2}$—$(Y^2)_{p3}$—B—$(Y^3)_{p6}$—$[C=X^2]_{p5}$—$(Y^4)_{p4}$—&&, and where (III) has the structure &—$(Y^5)_{p9}$—$(C=X^3)_{p8}$—$(Y^6)_{p7}$—&&, where, in the bridging radicals (II) and (III),
p1, p2, p3 are each 0 or 1, with the proviso that it is not simultaneously the case that p1=p3=1 and p2=0,
p4, p5, p6 are each 0 or 1, with the proviso that it is not simultaneously the case that p4=p6=1 and p5=0,
p7, p8, p9 are each 0 or 1, with the proviso that it is not simultaneously the case that p7=p9=1 and p8=0,
$X^1$, $X^2$, $X^3$ are independently selected from the group consisting of O, S,
$Y^1$, $Y^2$, $Y^3$, $Y^4$, $Y^5$, $Y^6$ are independently selected from the group consisting of O, S, NH, N-alkyl, where alkyl more preferably has 1 to 6, even more preferably 1 to 4, even more preferably 1 to 3 and even more preferably still 1 to 2 carbon atoms,
B is a divalent (hetero)aromatic radical, preferably phenylene, or a divalent aliphatic radical optionally substituted by at least one group selected from nitro group, —$NH_2$, —CN, —SH, —OH, halogen, and optionally having at least one group selected from ether, thioether, amino ether, carbonyl group, carboxylic ester group, carboxamide group.

Even more preferably, in the bridging radicals (II) and (III),
$X^1$, $X^2$, $X^3$, $Y^1$, $Y^2$, $Y^3$, $Y^4$, $Y^5$ are independently selected from the group consisting of O, S,
B is selected from phenylene, optionally halogen-substituted aliphatic radical optionally having at least one group selected from ether, thioether, carbonyl group, carboxylic ester group, carboxamide group; where B is most preferably an optionally halogen-substituted alkylene radical especially having 1 to 10, preferably 1 to 8, more preferably 1 to 6 and even more preferably still 1 to 4 carbon atoms and, when it has 2 or more carbon atoms, may have an ether group or thioether group.

Even more preferably, the compound of the structural formula (I) used is a compound of the structural formula (IV) in which $R^5$=methyl or hydrogen, preferably methyl, and Y is selected from the group consisting of —O—, &—O—(C=O)—&&, &—(C=O)—O—&&, bridging radical (II) having the structure &—$(O)_{p1}$—$[C=O]_{p2}$—$(O)_{p3}$—B—$(O)_{p6}$—$[C=O]_{p5}$—$(O)_{p4}$—&&, where, in the bridging radical (II),
p1, p2, p3 are each 0 or 1, with the proviso that it is not simultaneously the case that p1=p3=1 and p2=0,
p4, p5, p6 are each 0 or 1, with the proviso that it is not simultaneously the case that p4=p6=1 and p5=0,
where B is most preferably an optionally halogen-substituted alkylene radical especially having 1 to 10, preferably 1 to 8, more preferably 1 to 6 and even more preferably still 1 to 4 carbon atoms and, when it has 2 or more carbon atoms, may have an ether group or thioether group. Even more preferably, B is an alkyl radical having 1 to 10, more preferably 1 to 8, more preferably 1 to 6 and even more preferably still 1 to 4 carbon atoms; most preferably, B is selected from methylene, ethylene, n-propylene.

In a particularly preferred embodiment of the present invention, the compound of the structural formula (I) is the structure (V)

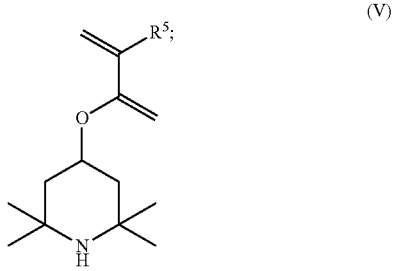

(V)

where $R^5$=H or methyl and even more preferably $R^5$=methyl.

The definition "where p1, p2, p3 are each 0 or 1, with the proviso that it is not simultaneously the case that p1=p3=1 and p2=0" means "where p1, p2, p3 are each 0 or 1, excluding the case that p1=1, p2=0, p3=1". This means that p1, p2, p3, in accordance with the invention, each independently assume the value of 0 or 1, with the restriction of the exclusion of the combination in which p1, p2, p3 assume the following values: p1=1 AND p2=0 AND p3=1.

The consequence of this definition is that, for example, when p1=1 and p2=0, it is the case in accordance with the invention that p3=0.

The definition "where p4, p5, p6 are each 0 or 1, with the proviso that it is not simultaneously the case that p4=p6=1 and p5=0" means "where p4, p5, p6 are each 0 or 1, excluding the case that p4=1, p5=0, p6=1". This means that p4, p5, p6, in accordance with the invention, each independently assume the value of 0 or 1, with the restriction of the exclusion of the combination in which p4, p5, p6 assume the following values: p4=1 AND p5=0 AND p6=1.

The consequence of this definition is that, for example, when p4=1 and p5=0, it is the case in accordance with the invention that p6=0.

The definition "where p7, p8, p9 are each 0 or 1, with the proviso that it is not simultaneously the case that p7=p9=1 and p8=0" means "where p7, p8, p9 are each 0 or 1, excluding the case that p7=1, p8=0, p9=1". This means that p7, p8, p9, in accordance with the invention, each independently assume the value of 0 or 1, with the restriction of the exclusion of the combination in which p7, p8, p9 assume the following values: p7=1 AND p8=0 AND p9=1.

The consequence of this definition is that, for example, when p7=1 and p8=0, it is the case in accordance with the invention that p9=0.

The process according to the invention comprises two successive steps (a) and (b).

In step (a) of the process according to the invention, a dispersion D of solid particles of the compound of the structural formula (I) in an aqueous phase is produced.

The "dispersion D", according to art knowledge and in the context of the invention, means a composition comprising solid particles [for example, in the case of the dispersion D, particles of the compound of the structural formula (I)] in an aqueous phase ("aqueous phase" implies here that this aqueous phase is a liquid phase). It will be apparent that, in the dispersion D according to the invention, the aqueous phase is the continuous phase and the solid particles of the compound of the structural formula (I) are the dispersed phase.

"Aqueous phase" means here that the aqueous continuous phase comprises water, in which case, more particularly, the proportion of water in the aqueous phase is >50.0% by weight, based on the total weight of the aqueous phase. Preferably, the proportion of water, based on the total weight of the aqueous phase, is at least 60.0% by weight, more preferably at least 70.0% by weight, even more preferably at least 80.0% by weight, even more preferably at least 90.0% by weight, even more preferably 92.0% by weight, even more preferably still at least 95.0% by weight, even further preferably at least 99.0% by weight and most preferably at least 99.3% by weight.

The process according to the invention differs from the prior art in that the particles of the compound of the structural formula (I) are present in the dispersion D in the form of solid particles in the aqueous phase. By contrast, in the comparable prior art processes to date (for instance in Examples 1-5 and 8 of EP 1 752 474 A1), all that has been described is polymerization in a mixture in which the monomer is in the liquid state or dissolved in an organic solvent. However, this procedure described in the prior art does not bring the advantages described hereinafter.

The person skilled in the art is familiar with methods of producing the dispersion D, and step (a) of the process according to the invention is therefore not restricted to a particular method.

In a preferred embodiment of the process according to the invention, a dispersion D of solid particles of the compound of the structural formula (I) in an aqueous phase is produced in step (a) by mixing solid particles of the compound of the structural formula (I) with an aqueous phase and dispersing it therein below the melting temperature of the compound of the structural formula (I). The dispersion can be achieved by methods of dispersion that are familiar to the person skilled in the art. Such methods are described, for example, in DE 10013850 A1 or WO 2009/016258 A1. They are based on exposure of the phase to be dispersed to strong shear forces (by stirring), resulting in distribution thereof in the continuous phase. For this purpose, commercially available dispersers are available to the person skilled in the art, for example dispersers of the Ultra-Turrax T series (from IKA-Werke GmbH and Co. KG, model: T 25 D).

In the above-described dispersion of the solid particles of the compound of the structural formula (I) in an aqueous phase, these are comminuted further even in the dispersing operation. If appropriate, the solid particles of the compound of the structural formula (I) may alternatively additionally be comminuted by grinding by methods familiar to those skilled in the art before they are dispersed in the aqueous phase. The mills used for this purpose may especially be a ball mill, a rotary ball mill, a vibratory mill, a hammer mill or a pulverizing stirrer system. Comminution methods of this kind are described, for example, in EP 0 373 633 A2, EP 0 231 878 A2.

In a first alternative preferred embodiment of the process according to the invention, the dispersion D is produced in step (a) by dispersing a mixture of the compound of the structural formula (I) and the aqueous phase at a temperature $T_{A1}$, where $T_{A1} > T_{SM}$ ["$T_{SM}$"=melting temperature of the compound of the structural formula (I) used] (it will be apparent that $T_{A1}$ is below the melting temperature of the aqueous phase and below the sublimation temperature or evaporation temperature of the compound of the structural formula (I)) and, after the dispersion, lowering the temperature from $T_{A1}$ to $T_{A2}$, where $T_{A2}<T_{SMI}$ (it will be apparent that $T_{A2}$ is above the melting temperature of the aqueous phase).

In a second alternative preferred embodiment of the process according to the invention, the dispersion D is produced in step (a) by dispersing a mixture of the compound of the structural formula (I) and the aqueous phase, where, on commencement of the dispersion, the temperature is set such that $T_{A1}>T_{SMI}$ ["$T_{SMI}$"=melting temperature of the compound of the structural formula (I) used] (it will be apparent that $T_{A1}$ is below the boiling temperature of the aqueous phase and below the sublimation temperature or evaporation temperature of the compound of the structural formula (I)) and, during the dispersion, lowering the temperature from $T_{A1}$ to $T_{A2}$, where $T_{A2}<T_{SMI}$ (it will be apparent that $T_{A2}$ is above the melting temperature of the aqueous phase).

At the temperature $T_{A1}$, the compound of the structure (I) is in molten form, and a mixture of the liquid compound of the structural formula (I) in the aqueous phase is formed.

By dispersion at a temperature $T_{A1}$, it is then possible in a particularly efficient manner to distribute the compound of the structure (I) in the aqueous phase and to form fine droplets of the compound of the structural formula (I) in the aqueous phase.

When the compound of the structure (I) is the structure (V), in the first alternative preferred embodiment of the process according to the invention just described, the dispersion D is especially produced by dispersing the mixture of the compound of the structural formula (V) and the aqueous phase at a temperature $T_{A1}$ in the range between >61° C. and <65° C., preferably in the range between ≥62° C. and <65° C., and, after the dispersion, lowering the temperature from $T_{A1}$ to $T_{A2}$, where $T_{A2} \leq 60°$ C., preferably $T_{A2} \leq 50°$ C., more preferably $T_{A2} \leq 45°$ C., even more preferably $T_{A2} \leq 40°$ C.

When the compound of the structure (I) is the structure (V), in the second alternative preferred embodiment of the process according to the invention just described, the dispersion D is especially produced by dispersing the mixture of the compound of the structural formula (V) and the aqueous phase, where, on commencement of the dispersion, a temperature $T_{A1}$ is set within the range between >61° C. and <65° C., preferably in the range between ≥62° C. and <65° C., and, during the dispersion, lowering the temperature from $T_{A1}$ to $T_{A2}$, where $T_{A2} \leq 60°$ C., preferably $T_{A2} \leq 50°$ C., more preferably $T_{A2} \leq 45°$ C., even more preferably $T_{A2} \leq 40°$ C.

The particle size of the solid particles of the compound of the structural formula (I) in the aqueous phase of the dispersion D is not particularly restricted. However, it is advantageous when the particle size of the solid particles of the compound of the structural formula (I) is within a particular range. The particle size can be easily adjusted by the person skilled in the art by the above-described processes, for example by the grinding operation or, specifically in alternative preferred embodiments of the process according to the invention, by varying the duration of the dispersion above $T_{SMI}$.

The particle size distribution is determined in the context of the invention by the method described in DIN 66156-2, using sieves according to DIN ISO 3310.

Thus, it is preferable in accordance with the invention when at least 50%, preferably at least 60%, more preferably at least 70%, even more preferably at least 80%, even more preferably at least 90% and even more preferably still at least 99% of the solid particles of the compound of the structural formula (I) used in the dispersion D have a particle size of ≤800 μm, determined in accordance with the invention by the method described in DIN 66156-2, using sieves according to DIN ISO 3310.

More particularly, at the same time, at least 80%, preferably at least 90% and more preferably at least 99% of the solid particles of the compound of the structural formula (I) used in the dispersion that have a particle size of ≤800 μm have a particle size between 32 and 400 μm.

At the end of step (a) of the process according to the invention, a dispersion D of solid particles of the compound of the structural formula (I) in an aqueous phase is then obtained.

The aqueous phase in the dispersion D may additionally comprise further constituents, especially at least one constituent selected from crosslinkers, surfactants, chain transfer agents.

More particularly, the aqueous phase in the dispersion D also comprises at least one crosslinker. Suitable crosslinkers are compounds having more than one polymerizable group, the crosslinker preferably being selected from the group consisting of polyfunctional compounds based on (meth) acrylic acid, polyfunctional compounds based on allyl ether, polyfunctional compounds based on vinylic compounds. Polyfunctional compounds based on (meth)acrylic acid are particularly preferred.

Polyfunctional compounds based on (meth)acrylic acid are especially selected from ethylene glycol di(meth)acrylate, diethylene glycol di(meth)acrylate, triethylene glycol di(meth)acrylate, polyethylene glycol di(meth)acrylate, propane-1,3-diol di(meth)acrylate, butane-2,3-diol di(meth) acrylate, butane-1,4-diol di(meth)acrylate, pentane-1,5-diol di(meth)acrylate, hexane-1,6-diol di(meth)acrylate, heptane-1,7-diol di(meth)acrylate, octane-1,8-diol di(meth) acrylate, nonane-1,9-diol di(meth)acrylate, decane-1,10-diol di(meth)acrylate, trimethylolpropane tri(meth)acrylate, glycerol di(meth)acrylate, 2-hydroxy-3-(meth)acryloyloxypropyl (meth)acrylate.

Polyfunctional compounds based on allyl ether are especially selected from the group consisting of diethylene glycol diallyl ether, dibutylene glycol diallyl ether.

A polyfunctional compound based on vinylic compounds is especially divinylbenzene.

If a crosslinker is used, it is preferably used in such an amount that, in the aqueous phase in the dispersion D, in step (a) of the process according to the invention, all crosslinkers are used in an amount of 0.001 to 25 mol %, more preferably 0.005 to 10 mol %, even more preferably 0.01 to 5 mol %, based in each case on all compounds of the structure (I) in the dispersion.

If crosslinkers are used, the polymer $P^1$ may also have repeat units attributable to this crosslinker. It will thus be apparent that repeat units attributable to the crosslinker may also be present between the polymerization units in the polymer $P^1$ obtained.

In addition, the aqueous phase in the dispersion D may especially also comprise at least one surfactant which may be anionic, cationic, amphoteric or nonionic. Particular preference is given to anionic and nonionic surfactants.

Anionic surfactants are especially selected from sodium or potassium salts of fatty acids, sodium alkylsulphates (preferably sodium dodecylsulphate), sodium alkylbenzenesulphonates, sodium alkylsulphonates, sodium alkylphosphates, N-acylmethyltaurates, sodium N-methyl-N-acylamidopropionates, sodium monoalkyl biphenyl ether disulphonates, sodium naphthalenesulphonate formalin condensates, sodium acylglutamates, sodium polyoxyethylene alkyl ether sulphates, sodium polyoxyethylene alkyl phenyl ether alkylbenzenesulphonates, sodium polyoxyethylene alkyl ether methyl carboxylates, sodium polyoxyethylene alkyl ether ethanesulphonates. Preferably in accordance with the invention, the anionic surfactants are sodium alkylsulphates, even more preferably sodium dodecylsulphate.

Cationic surfactants are especially selected from the group consisting of cationic cellulose compounds, monoalkyltrimethylammonium methylsulphates, alkyltrimethylammonium chloride, distearyldimethylammonium chloride, dialkyldimethylammonium chloride, dialkyldimethylbenzylammonium chloride, alkylpyridinium chlorides.

Nonionic surfactants are especially selected from the group consisting of fatty acid monoglycerides, at least partly fatty acid-esterified sorbitan, polyoxyethylene alkyl ethers, polyoxyethylene alkyl phenyl ethers (especially polyoxyethylene nonylphenyl ether), polyoxyethylene fatty acid monoglycerides, at least partly fatty acid-esterified polyoxyethylenesorbitol or -sorbitan, polyoxyethylene lanolin alcohol ethers, polyethylene glycol fatty acid monoesters and diesters, polyoxyethylene fatty amines, at least partly fatty acid-esterified polyglycerol, bis(2-hydroxyethyl)alkylamine, alkyldimethylamine oxide, fatty acid alkylolamides, ω-methoxypolyoxyethylene α-alkyl ethers, block copolymers of polyoxyethylene and polyoxypropylene, polyoxyethylene-polyoxypropylene alkyl ethers, polyoxyethylene acetylene glycol, at least partly fatty acid-esterified sugars.

Amphoteric surfactants are especially selected from the group consisting of N-acylamido-N,N-dimethylaminobetaine, N-acylamidopropyl-N,N'dimethyl-N'-β-hydroxypropylammoniumsulphobetaine, N-acylamidoethyl-N'-hydroxyethyl-N'-carboxymethylammoniobetaine, N-alkyl-N-dimethyl-N-carboxymethylammoniobetaines.

If a surfactant is used, it is preferably used in such an amount that, in the aqueous phase in the dispersion D, in step (a) of the process according to the invention, the total amount of all surfactants is from 0.1% to 10% by weight, more preferably 0.5% to 5% by weight, even more preferably 0.7% to 2.5% by weight, based in each case on the weight of the water encompassed by the aqueous phase in the dispersion D.

More particularly, the aqueous phase also comprises, in the dispersion D, at least one chain transfer agent for regulating, especially reducing, the molar mass of the polymer obtained. Suitable chain transfer agents are compounds having at least one thiol group. The chain transfer agent is preferably selected from the group consisting of tert-butyl mercaptan, 2-ethylhexyl thioglycolate, mercaptoethanol, mercaptopropyltrimethoxysilane, tert-dodecyl mercaptan. More preferably, the chain transfer agent is 2-ethylhexyl thioglycolate.

If a chain transfer agent is used, it is preferably used in such an amount that, in the aqueous phase in the dispersion D, in step (a) of the process according to the invention, the total amount of all chain transfer agents is from 0.01% to 1% by weight, more preferably 0.02% to 0.5% by weight, based in each case on the weight of all compounds of the structure (I) encompassed by the dispersion.

The aqueous phase may also include a proportion of organic solvents that are familiar to the person skilled in the art, provided that the compound of the structure (I) is present in the form of solid particles in the aqueous phase. "Organic solvents" are especially selected from toluene, xylene, benzene, cyclohexane, hexane, ethyl acetate, tetrahydrofuran.

However, it is preferable that the aqueous phase does not include any organic solvents, which means in accordance with the invention that the proportion of organic solvents, based on the total weight of the aqueous phase, is especially <2% by weight, more preferably <1% by weight, even more preferably <0.1% by weight.

In step b) of the process according to the invention, the solid particles of the compound of the structural formula (I) of the dispersion produced in step (a) are then polymerized at a temperature below the melting temperature of the compound of the structural formula (I) used.

The performance of the polymerization is familiar to the person skilled in the art. The polymerization may be a cationic, anionic or free-radical polymerization, but preferably a free-radical or anionic polymerization, even more preferably a free-radical polymerization. Since the polymerization is that of solid particles in an solution, it is preferable to keep the dispersion D in motion in the course of performance of step (b) of the process according to the invention, for example by shaking or agitating, in order to counteract the tendency of the particles to settle out. This can be accomplished by methods familiar to the person skilled in the art.

It is an essential feature of the process according to the invention that the polymerization in step b) is conducted at a temperature below the melting temperature of the compound of the structural formula (I) used. This distinguishes the process according to the invention from that described in the prior art (e.g. EP 1 752 474 A1, Example 8).

Preferably, the polymerization in step b) is conducted at a temperature 1° C. or more below the melting temperature of the compound of the structural formula (I) used. More preferably, the polymerization in step b) is conducted at a temperature 5° C. or more, even more preferably 10° C. or more, even more preferably 20° C. or more, below the melting temperature of the compound of the structural formula (I) used.

When the compound of the structure (I) is the structure (V), step b) is especially conducted at a temperature of ≤60° C., preferably ≤50° C., more preferably ≤45° C., even more preferably ≤40° C.

It will be apparent that the polymerization in step b), however, is conducted above the temperature at which the aqueous phase is converted to the solid state of matter.

As is known to the person skilled in the art, the polymerization is commenced by addition of a polymerization initiator. In the case of the free-radical polymerization which is preferred here, the initiator is a free-radical initiator.

The polymerization initiator, i.e. the free-radical initiator in the case of the free-radical polymerization which is preferred here, is added to the dispersion D obtained in step (a), preferably directly at the start of step (b), i.e. after lowering of the temperature of the dispersion D obtained in step (a) below the melting point of the compound of the structural formula (I) used.

Free-radical initiators used may be any compounds familiar to the person skilled in the art. More particularly, the free-radical initiator in accordance with the invention is one which is water-soluble and is preferably selected from the group consisting of peroxidic free-radical initiators and redox systems, particular preference being given to the peroxidic free-radical initiators.

Peroxidic free-radical initiators are preferably selected from the group consisting of persulphates, peroxodisulphates, preferably peroxodisulphates. Persulphates are especially ammonium persulphate, sodium persulphate, potassium persulphate. Peroxodisulphates are especially ammonium peroxodisulphate, sodium peroxodisulphate, potassium peroxodisulphate, more preferably ammonium peroxodisulphate, potassium peroxodisulphate.

Redox systems are preferably selected from ammonium iron(II) sulphate/ammonium persulphate, ethanolamine/potassium persulphate.

More particularly, in step b) of the process according to the invention, the temperature of the dispersion D is below the melting temperature of the compound of the structural formula (I) used until at least 30%, preferably at least 40%, more preferably at least 50%, even more preferably at least 60%, even more preferably at least 70%, even more preferably at least 80%, especially preferably at least 90%, even more preferably at least 95% and most preferably at least 99% of the compound of the structural formula (I) used in step (a) of the process according to the invention has reacted. With the very most preference, the entirety of step (b) is conducted at a temperature below the melting temperature of the compound of the structural formula (I) used.

The proportion of the reacted compound of the structural formula (I) can be ascertained via the residual monomer content in the solution and is found from the difference between the amount of compound of the structural formula (I) originally used and the residual monomer content ascertained. The residual monomer content can be ascertained in accordance with the invention by HPLC analysis, according to the invention, for example, by analysing a sample of the solution by test method M1 (described in the Examples section).

This ensures that the polymerization takes place between the solid particles of the compound of the structural formula (I).

The following surprising observations have been made:

Firstly, it is not to be expected in the prior art that polymerization of the compound of the structural formula (I) is possible at all in the solid state. Secondly, it is surprising that the process according to the invention leads to polymers that are much easier to work up. While the polymers obtained by the conventional processes stick together to form coagulates that can be worked up only with difficulty, the process according to the invention affords finely divided polymer particles which can be separated by simple methods, for example filtration, and used further. By contrast, the products obtained by the prior art processes have to be isolated in a costly and inconvenient manner and additionally ground in order to be able to be processed further. This is important in industrial scale processes in particular, in which the process according to the invention allows an entire step to be dispensed with.

It is also possible in a further embodiment of the present invention additionally to conduct the polymerization in step (b) in the presence of conductivity additives, for example carbon nanoplatelets or "carbon nanotubes", which facilitates later incorporability in an electrode, for example.

After step (b), a polymer $P^1$ comprising repeat units of the structural formula (VI)

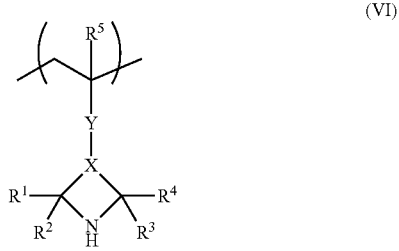

(VI)

is obtained.

After the polymer $P^1$ has been obtained, it can be isolated, for which methods familiar to the person skilled in the art are available. As described, it is a feature of the process according to the invention that the product can be filtered directly and is then in a particle size of good usability. By contrast, the products of the prior art have to be isolated in a comparatively costly and inconvenient manner and then additionally ground, in order to obtain products of good further processibility. Nevertheless, the polymer $P^1$ obtained after step (b) can of course be subjected to the purification methods familiar to the person skilled in the art, for example washing with water or organic solvents such as hexane and/or methanol, followed by a drying step.

Alternatively and preferably, the polymer $P^1$ obtained in step (b) can also be oxidized directly to the nitroxide in the aqueous phase ("oxidation to the nitroxide" is also referred to as "nitroxidation" in the context of the invention).

In a preferred embodiment, the polymer $P^1$ obtained in step (b), after step (b), is subjected to a nitroxidation, giving a polymer $P^2$ comprising repeat units of the structural formula (VII)

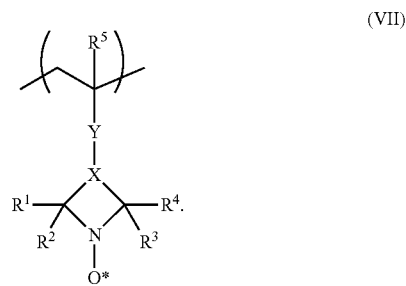

(VII)

It will be apparent that, in structure (VII), the $R^1$, $R^2$, $R^3$, $R^4$, $R^5$, X, Y radicals have the definitions given for each of these radicals in structure (I).

For this purpose, it is possible to make use of the methods of converting a secondary amine to a radical nitroxide that are familiar to the person skilled in the art (e.g. EP 1 911 775 A1). For example, the polymer $P_1$ can be dissolved in an inert solvent and then an oxidizing agent can be added, preferably while stirring.

The inert solvent is especially selected from the group consisting of halogenated hydrocarbons, aliphatic nitriles, aromatic nitriles, alcohols, aromatic hydrocarbons, water. Preference is given to using water and/or alcohols as the inert solvent, even more preferably mixtures of water and alcohols.

Halogenated hydrocarbons are preferably selected from the group consisting of dichloromethane, chloroform, dichloroethane. Aliphatic nitriles are preferably selected from the group consisting of acetonitrile, propionitrile, butyronitrile. Aromatic nitriles are preferably selected from the group consisting of benzonitrile, phenylacetonitrile. Alcohols are preferably selected from the group consisting of methanol, ethanol, n-propanol, iso-propanol, n-butanol, sec-butanol, iso-butanol, tert-butanol, preferably methanol. Aromatic hydrocarbons are preferably selected from the group consisting of benzene, toluene.

The inert solvent is especially used in such an amount that the weight of the inert solvent used is 10 to 5000 times, preferably 50 to 3000 times and more preferably 100 times the weight of the polymer $P^1$ used.

Oxidizing agents used may likewise be the oxidizing agents familiar to the person skilled in the art. The oxidizing agent is especially selected from the group consisting of peroxides, metal compounds, air, preferably peroxides.

Peroxides are preferably selected from the group consisting of hydrogen peroxide, performic acid, peracetic acid, perbenzoic acid, perphthalic acid, meta-chloroperbenzoic acid. The most preferred peroxide is hydrogen peroxide.

Metal compounds are preferably selected from the group consisting of silver oxide, lead tetraacetate, potassium hexacyanoferrate(III), potassium permanganate.

The oxidizing agent is especially used in such an amount that 1 to 40 mol, more preferably 1.5 to 15 mol, more preferably 1.5 to 5 mol and even more preferably 1.6 to 3 mol of the oxidizing agent are used per mole of the monomer (I) used for polymerization.

In the oxidation, it is additionally also possible to make use of a catalyst. The catalysts used in nitroxidation are familiar to the person skilled in the art.

More particularly, nitroxidation can be accomplished using catalysts selected from compounds of the metals of the chromium group, especially molybdenum and tungsten. Preferably, the catalyst used for nitroxidation is a compound of tungsten.

Compounds of tungsten are especially selected from the group consisting of tungstic acid, tungstophosphoric acid, paratungstic acid, tungstates, tungstophosphates, paratungstates, tungsten oxides, tungsten carbonyls. Preferably, compounds of tungsten are selected in accordance with the invention from alkali metal salts and ammonium salts of the tungstates, more preferably from the group consisting of ammonium tungstate, sodium tungstate, potassium tungstate, even more preferably sodium tungstate.

Compounds of molybdenum are especially selected from the group consisting of molybdic acid, molybdophosphoric acid, paramolybdic acid, molybdates, molybdophosphates, paramolybdates, molybdenum oxides, molybdenum carbonyls. Preferably, compounds of tungsten are selected in accordance with the invention from alkali metal salts and ammonium salts of the molybdates, more preferably from the group consisting of ammonium molybdate, sodium molybdate, potassium molybdate, molybdenum trioxide, molybdenum hexacarbonyl.

The catalyst is especially used in such an amount that 0.1 to 10 mol %, more preferably 1 to 5 mol %, even more preferably 2 to 3.5 mol % and even more preferably still 2.5 to 3.0 mol % of the catalyst is used per mole of the compound of the structure (I) used in step (a) of the process according to the invention.

The temperature in the nitroxidation is not particularly restricted, and is especially in the range of 0 to 75° C., preferably 20 to 50° C.

The reaction time is likewise not particularly restricted, and is especially 1 to 10 hours, preferably 3 to 6 hours.

The polymer $P^2$ obtained is then likewise isolated by methods familiar to the person skilled in the art, such as filtration and subsequent drying.

The polymer $P^2$ is especially suitable for use as redox-active electrode material in an electrical charge storage means, preferably for storage of electrical energy, and more preferably as a positive electrode element.

More preferably, the redox-active electrode material takes the form of an at least partial surface coating of electrode elements for electrical charge storage means, especially secondary batteries. Electrode elements here comprise at least one surface layer and one substrate.

A redox-active material for storage of electrical energy is a material which can store electrical charge and release it again, for example by accepting and releasing electrons.

This material can be used, for example, as an active electrode material in an electrical charge storage means. Such electrical charge storage means for storage of electrical energy are especially selected from the group consisting of secondary batteries (also called "accumulators"), redox flow batteries, supercapacitors, and preferably secondary batteries.

Preferably, the electrical charge storage means is a secondary battery. A secondary battery comprises a negative electrode and a positive electrode which are separated from one another by a separator, and an electrolyte which surrounds the electrodes and the separator.

The separator is a porous layer which is ion-permeable and enables the balancing of the charge. The task of the separator is to separate the positive electrode from the negative electrode and to enable balancing of charge through permutation of ions. The separator used in the secondary battery is especially a porous material, preferably a membrane consisting of a polymeric compound, for example polyolefin, polyamide or polyester. In addition, it is possible to use separators made from porous ceramic materials.

The main task of the electrolyte is to assure ion conductivity, which is needed to balance the charge. The electrolyte of the secondary battery may be either a liquid or an oligomeric or polymeric compound having high ion conductivity ("gel electrolyte" or "solid state electrolyte"). Preference is given, however, to an oligomeric or polymeric compound.

If the electrolyte is liquid, it is especially composed of one or more solvents and one or more conductive salts.

The solvent of the electrolytes preferably independently comprises one or more solvents having a high boiling point and high ion conductivity but low viscosity, for example acetonitrile, dimethyl sulphoxide, ethylene carbonate, propylene carbonate, dimethyl carbonate, diethyl carbonate, methyl ethyl carbonate, γ-butyrolactone, tetrahydrofuran, dioxolane, 1,2-dimethoxymethane, 1,2-dimethoxyethane, diglyme, triglyme, tetraglyme, ethyl acetate, 1,3-dioxolane or water.

The conductive salt in the electrolyte consists of a cation of the formula $M^{e+}$ and an anion of the formula $An^{f-}$ of the formula $(M^{e+})_a(An^{f-})_b$ where e and f are integers depending on the charge of M and An; a and b are integers which represent the molecular composition of the conductive salt.

Cations used in the abovementioned conductive salt are positively charged ions, preferably metals of the first and second main groups, for example lithium, sodium, potassium or magnesium, but also other metals of the transition groups, such as zinc, and organic cations, for example quaternary ammonium compounds such as tetraalkylammonium compounds. The preferred cation is lithium.

Anions used in said conductive salt are preferably inorganic anions such as hexafluorophosphate, tetrafluoroborate, triflate, hexafluoroarsenate, hexafluoroantimonate, tetrafluoroaluminate, tetrafluoroindate, perchlorate, bis(oxalato)borate, tetrachloroaluminate, tetrachlorogallate, but also organic anions, for example $N(CF_3SO_2)_2^-$, $CF_3SO_3^-$, alkoxides, for example tert-butoxide or iso-propoxide, but also halides such as fluoride, chloride, bromide and iodide. The preferred anion is perchlorate, $ClO_4^-$.

The preferred conductive salt is thus $LiClO_4$.

If ionic liquids are used, they can be used either as solvent of the electrolyte, as conductive salt, or else as complete electrolyte.

In the embodiment in which the redox-active electrode material takes the form of an at least partial surface coating of electrode elements for electrical charge storage means, especially secondary batteries, an electrode element has an at least partial layer on a substrate surface. This layer especially comprises a composition comprising the polymer according to the invention as redox-active material for charge storage and especially at least also a conductivity additive and especially also at least one binder additive.

The application of this composition (another expression for composition: "composite") on the substrate is possible by means of methods known to those skilled in the art. More particularly, the polymer according to the invention is applied on the substrate with the aid of an electrode slurry.

The substrate of the electrode element is especially selected from conductive materials, preferably metals, carbon materials, oxide substances.

Preferred metals are selected from platinum, gold, iron, copper, aluminium or a combination of these metals. Preferred carbon materials are selected from glassy carbon, graphite film, graphene, carbon sheets. Preferred oxide substances are, for example, selected from the group consisting of indium tin oxide (ITO), indium zinc oxide (IZO), antimony zinc oxide (AZO), fluorine tin oxide (FTO) or antimony tin oxide (ATO).

The surface layer of the electrode element comprises at least the polymer according to the invention as redox-active material for charge storage and especially at least a conductivity additive and a binder additive.

The conductivity additive is especially at least one electrically conductive material, preferably selected from the group consisting of carbon materials, electrically conductive polymers, and especially carbon materials. Carbon materials are especially selected from the group consisting of carbon platelets, carbon fibres, carbon nanotubes, graphite, carbon black, graphene, and are more preferably carbon fibres. Electrically conductive polymers are especially selected from the group consisting of polyanilines, polythiophenes, polyacetylenes, poly(3,4-ethylenedioxythiophene) polystyrenesulphonate (=PEDOT:PSS), polyarcenes.

Binder additives are especially materials having binder properties and are preferably polymers selected from the group consisting of polytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

The polymer $P^2$ is especially applied to the substrate of the electrode element in an electrode slurry.

The electrode slurry is a solution or suspension and comprises the polymer according to the invention and especially the above-described conductivity additive and the above-described binder additive.

The electrode slurry preferably comprises a solvent and further constituents comprising redox-active material for storage of electrical energy (which is especially the polymer according to the invention), and preferably also the conductivity additive and the binder additive.

In the further constituents, preferably, the proportion of the redox-active material for storage of electrical energy (which is especially the polymer according to the invention) is from 5 to 100 percent by weight, the proportion of the conductivity additive from 0 to 80 and preferably 5 to 80 percent by weight, and the proportion of binder additive 0 to 10 and preferably 1 to 10 percent by weight, where the sum total is 100 percent by weight.

Solvents used for the electrode slurry are independently one or more solvents, preferably solvents having a high boiling point, more preferably selected from the group consisting of N-methyl-2-pyrrolidone, water, dimethyl sulphoxide, ethylene carbonate, propylene carbonate, dimethyl carbonate, methyl ethyl carbonate, γ-butyrolactone, tetrahydrofuran, dioxolane, sulpholane, N,N'-dimethylformamide, N,N'-dimethylacetamide. The concentration of the redox-active material, especially of the polymer according to the invention, for storage of electrical energy in the abovementioned electrode slurry is preferably between 0.1 and 10 mg/ml, more preferably between 0.5 and 5 mg/ml.

If the polymer of this invention as redox-active material is used as positive electrode element for electrical charge storage means, the redox-active material used for electrical charge storage in the negative electrode is a material which exhibits a redox reaction at a lower electrochemical potential than the polymer of this invention. Preference is given to those materials selected from the group consisting of carbon materials, which are especially selected from the group consisting of graphite, graphene, carbon black, carbon fibres, carbon nanotubes, metals or alloys, which are especially selected from the group consisting of lithium, sodium, magnesium, lithium-aluminium, Li—Si, Li—Sn, Li—Ti, Si, SiO, $SiO_2$, Si—$SiO_2$ complex, Zn, Sn, SnO, $SnO_2$, PbO, $PbO_2$, GeO, $GeO_2$, $WO_2$, $MoO_2$, $Fe_2O_3$, $Nb_2O_5$, $TiO_2$, $Li_4Ti_5O_{12}$, and $Li_2Ti_3O_7$, and organic redox-active materials. Examples of organic redox-active materials are compounds having a stable organic radical, compounds having an organosulphur unit, having a quinone structure, compounds having a dione system, conjugated carboxylic acids and salts thereof, compounds having a phthalimide or naphthalimide structure, compounds having a disulphide bond and compounds having a phenanthrene structure and derivatives thereof. If an abovementioned redox-active oligomeric or polymeric compound is used in the negative electrode, this compound may also be a composite, i.e. a composition, consisting of this oligomeric or polymeric compound, a conductivity additive and a binder additive in any ratio. The conductivity additive in this case too is especially at least one electrically conductive material, preferably selected from the group consisting of carbon materials, electrically conductive polymers, and especially carbon materials. Carbon materials are especially selected from the group consisting of carbon fibres, carbon nanotubes, graphite, carbon black, graphene, and are more preferably carbon fibres. Electrically conductive polymers are especially selected from the group consisting of polyanilines, polythiophenes, polyacetylenes, poly(3,4-ethylenedioxythiophene) polystyrenesulphonate (="PEDOT:PSS"), polyarcenes. Binder additives in this case too are especially materials having binder properties and are preferably polymers selected from the group consisting of polytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

This composite may, as described above, be present as a layer on a substrate through a known film-forming process with the aid of an electrode slurry.

The examples which follow are intended to further elucidate the invention, but without restricting it thereto.

EXAMPLES

I. Chemicals Used 2,2,6,6-Tetramethyl-4-piperidinyl methacrylate (CAS number: 31582-45-3; melting point 61° C., abbreviated hereinafter as "TAA-ol-MA") was synthesized by prior art methods.

Sodium laurylsulphate (CAS number: 151-21-3) was obtained from Cognis and BASF.

2-Ethylhexyl thioglycolate (CAS number: 7659-86-1) was obtained from Spiess Chemische Fabrik GmbH.

Triethylene glycol dimethacrylate (CAS number: 109-16-0) was obtained from Evonik Industries AG.

Ethylene glycol dimethacrylate (CAS number: 97-90-5) was obtained from Evonik.

Ammonium peroxodisulphate (CAS number: 7727-54-0) was obtained from Sigma Aldrich.

Potassium peroxodisulphate (CAS number: 7722-21-1) was obtained from Sigma Aldrich.

Polyoxyethylene nonylphenyl ether (CAS number: 68412-54-4) was obtained from Sigma Aldrich.

Sodium dodecylbenzenesulphonate (CAS number: 25155-30-0) was obtained from Sigma Aldrich.

4,4'-Azobis(4-cyanovaleric acid) (CAS number: 2638-94-0) was obtained from Wako V-501 #AWL2803.

Sodium tungstate dihydrate (CAS number: 10213-10-2) was obtained from Sigma Aldrich.

Ethylenediaminetetraacetic acid (abbreviated hereinafter as "EDTA"; CAS number: 60-00-4) was obtained from Roth.

Polysorbate was obtained (as "TEGO SMO 80V") from Evonik Industries AG.

The graphene nanoplatelets used in I6 are XG Sciences xGnP C 500, while the multi-wall carbon nanotubes were Nanocyl NC7000 MWCNTs.

II. Test Methods

M1: Determination of the Content of Compound (I) in a Sample, Shown Using TAA-ol-MA 50 mg to 1 g of the sample were weighed accurately to 0.0001 g into a 10 ml standard flask and made up to the mark with acetonitrile. The samples contained polymer which was insoluble since it was highly crosslinked and, in order to leach out the TAA-ol-MA, were dispersed with a stirrer for 2 hours. This solution was dispensed into HPLC vials and analysed.

This is followed by an HPLC analysis with the following instrumentation:

HPLC column type: ODS-3 RP18—column dimensions: length 125 mm, internal diameter 3 mm; packing material 5 µm;

Gradient: from 0 min to 15 min the gradient was increased from 1:9=methanol:phosphate buffer pH 4.5 to 9:1=methanol:phosphate buffer, followed by elution at 9:1=methanol:phosphate buffer to 18 minutes.

The calibration solution used was 50 mg of TAA-ol-MA in a 50 ml standard flask.

Via the integration of the peak areas in the HPLC chromatogram, the amount of TAA-ol-MA in the particular sample was then determined.

III. Experimental Procedures

C1 and C2 are noninventive examples; I1 to I6 are inventive examples.

C1: Reworking of Example 8 from EP 1 752 474 A1

150.0 g of TAA-ol-MA, 1 g of a mixture of 2 parts sodium dodecylbenzenesulphonate and 1 part polyoxyethylene nonylphenyl ether and 2.7 g of ethylene glycol dimethacrylate were added to 467 ml of water in a 1 l jacketed reactor with stirrer and condenser, and heated to 65° C. Then the mixture was stirred at 65° C. for 1 hour, and a homogeneous solution was obtained. Then the solution was blanketed with nitrogen, and 0.38 g of potassium peroxodisulphate was added. Thereafter, the solution was heated up to 70° C. and left to react for 6 hours. Thereafter, the solution was cooled down to room temperature and added to 2 l of water (5° C.). Only a few fine particles were observed, but more than 50% of caking and coagulate was observed in the reactor. This made it difficult and time-consuming to isolate the polymer from the reactor. The yield of polymer was determined as ~90%.

C2: Repetition of C1 with Higher Amount of Surfactant

Experiment C1 was repeated, except using 3 g of a mixture of 2 parts sodium dodecylbenzenesulphonate and 1 part polyoxyethylene nonylphenyl ether.

The coagulation of the polymer obtained was even more significant here, and isolation thereof from the reactor was even more difficult.

I1: Example 8 from EP 1 752 474 A1, but Polymerization at Temperature<Melting Point 150.0 g of TAA-ol-MA (melting point 61° C.), 1 g of a mixture of 2 parts sodium dodecylbenzenesulphonate and 1 part polyoxyethylene nonylphenyl ether and 2.7 g of ethylene glycol dimethacrylate were added to 467 ml of water in a 1 l jacketed reactor with stirrer and condenser, and heated to 65° C. Thereafter, the mixture was dispersed at 6000 rpm for 15 min with an Ultraturrax (machine: Ultra-Turrax T series disperser; from IKA-Werke GmbH and Co. KG; model: T 25 D; dispersion tool: S 25 N-25 G) and then while cooling to 40° C. over 30 minutes.

Half the dispersion was removed and the size of the particles in the dispersion obtained was determined by the method described in DIN 66156-2, using sieves according to DIN ISO 3310.

The results in respect of the particle sizes are shown in the following table:

| Particle size [µm] | Proportion in % |
|---|---|
| >800 | 0.16 |
| 600-800 | 0.35 |
| 400-600 | 1.34 |
| 200-400 | 23.77 |
| 100-200 | 62.55 |
| 63-100 | 11.39 |
| 32-63 | 0.43 |
| <32 | 0.00 |

The dispersion thus obtained was transferred into a reactor, and equilibrated further therein to 40° C. The dispersion was placed under a nitrogen blanket and the passage of nitrogen was continued during the reaction that followed. Thereafter, 0.27 g of ammonium peroxodisulphate was added and the mixture was stirred overnight at a temperature between 40° C. and 45° C. To complete the reaction, the mixture was then polymerized at 65° C. for another 1 hour. Then the solution was cooled to room temperature.

The quantitative yield of polymer corresponded to that ascertained in C1, but no coagulate at all was observed in the mixture obtained, merely a few deposits on the wall of the reactor. The polymer was in the form of a finely distributed precipitate in the reactor and could be isolated and filtered off without a problem.

I2: Repetition of I1 with Higher Amount of Surfactant

Experiment I1 was repeated, except using 3 g of a mixture of 2 parts sodium dodecylbenzenesulphonate and 1 part polyoxyethylene nonylphenyl ether.

After the dispersion had been produced, half the dispersion was again removed and the size of the particles in the dispersion obtained was determined by the method described in DIN 66156-2, using sieves according to DIN ISO 3310.

The results in respect of the particle sizes are shown in the following table:

| Particle size [μm] | Proportion in % |
|---|---|
| >800 | 0.59 |
| 600-800 | 1.94 |
| 400-600 | 4.83 |
| 200-400 | 13.22 |
| 100-200 | 54.53 |
| 63-100 | 23.90 |
| 32-63 | 0.99 |
| <32 | 0.00 |

Coagulation of the polymer obtained was likewise absent here as in the case of I1, and isolation thereof from the reactor was problem-free.

Comparison of C1 and C2 with I1/I2 shows that a finely distributed polymer is obtained by the process according to the invention, which makes the workup thereof much easier.

The experiments I3 to I6 described hereinafter show that the polymer obtained can also advantageously be oxidized, as necessary for production of an electrode material.

Example I3

60.0 g of TAA-ol-MA, 4.0 g of 15% aqueous sodium laurylsulphate solution, 0.3 g of 2-ethylhexyl thioglycolate and 0.6 g of triethylene glycol dimethacrylate were added to 240 ml of water in a 1 l jacketed reactor with stirrer and condenser, and heated to 65° C. Once the TAA-ol-MA had melted, dispersion was effected with an Ultra Turrax at 6000 rpm for 15 min. This was followed by cooling gradually under Ultra Turrax shear over the course of 30 minutes. At 40° C., 0.06 g of ammonium peroxodisulphate was then added for polymerization and reaction was effected over the course of 2 hours. Subsequently, reaction was continued at 45° C. overnight and then the polymerization was completed at 65° C. over the course of 1 h. After cooling to room temperature, the reaction solution was then concentrated to half the volume and the particles were swollen by addition of 240 ml of methanol. This was followed by the addition of 2.6 g of sodium tungstate dihydrate and 0.7 g of EDTA to catalyse the oxidation. The oxidation was then effected by the addition, in portions, of 3×9 g of 30% aqueous hydrogen peroxide solution at half-hourly intervals and then, after a further 1.5 hours, a further addition of 26.8 g of hydrogen peroxide solution. The mixture was then stirred for 72 hours and, towards the end, heated once again to 40° C. and 45° C. for one hour each. After cooling, the reaction solids were filtered off, washed with water and dried in a vacuum drying cabinet.

A homogeneous powder and caking and coagulates of <2% in the reactor were obtained.

Example I4

60.0 g of TAA-ol-MA, 8.0 g of 15% aqueous sodium laurylsulphate solution, 0.3 g of 2-ethylhexyl thioglycolate and 0.6 g of triethylene glycol dimethacrylate were added to 240 ml of water in a 1 l jacketed reactor with stirrer and condenser, and heated to 65° C. Once the TAA-ol-MA had melted, dispersion was effected with an Ultra Turrax at 6000 rpm for 15 min. This was followed by cooling gradually under Ultra Turrax shear over the course of 30 minutes. At 40° C., 0.06 g of ammonium peroxodisulphate was then added for polymerization and reaction was effected over the course of 2 hours. Subsequently, reaction was continued at 45° C. overnight and then the polymerization was completed at 65° C. over the course of 1 h. After cooling to room temperature, the reaction solution was then concentrated to half the volume and the particles were swollen by addition of 240 ml of methanol. This was followed by the addition of 2.6 g of sodium tungstate dihydrate and 0.7 g of EDTA to catalyse the oxidation. The oxidation was then effected by the addition, in portions, of 3×9 g of 30% aqueous hydrogen peroxide solution at half-hourly intervals and then, after a further 1.5 hours, a further addition of 26.8 g of hydrogen peroxide solution. The mixture was then stirred for 72 hours and, towards the end, heated once again to 40° C. and 45° C. for one hour each. After cooling, the reaction solids were filtered off, washed with water and dried in a vacuum drying cabinet.

In this case too, a homogeneous powder and caking and coagulates of <2% in the reactor were ultimately obtained.

Example I5

60.0 g of TAA-ol-MA, 4.0 g of 15% aqueous sodium laurylsulphate solution, 4.0 g of 15% aqueous TEGO SMO 80V solution, 0.3 g of 2-ethylhexyl thioglycolate and 0.6 g of triethylene glycol dimethacrylate were added to 240 ml of water in a 1 l jacketed reactor with stirrer and condenser, and heated to 65° C. Once the TAA-ol-MA had melted, dispersion was effected with an Ultra Turrax at 6000 rpm for 15 min. This was followed by cooling gradually under Ultra Turrax shear over the course of 30 minutes. At 40° C., 0.06 g of ammonium peroxodisulphate was then added for polymerization and reaction was effected over the course of 2 hours. Subsequently, reaction was continued at 45° C. overnight and then the polymerization was completed at 65° C. over the course of 1 h. After cooling to room temperature, the reaction solution was then concentrated to half the volume and the particles were swollen by addition of 240 ml of methanol. This was followed by the addition of 2.6 g of sodium tungstate dihydrate and 0.7 g of EDTA to catalyse the oxidation. The oxidation was then effected by the addition, in portions, of 3×9 g of 30% aqueous hydrogen peroxide solution at half-hourly intervals and then, after a further 1.5 hours, a further addition of 26.8 g of hydrogen peroxide solution. The mixture was then stirred for 72 hours and, towards the end, heated once again to 40° C. and 45° C. for one hour each. After cooling, the reaction solids were filtered off, washed with water and dried in a vacuum drying cabinet.

A homogeneous powder and caking and coagulates of <2% in the reactor were obtained.

Example I6

2.3 g of graphene nanoplatelets (XG Sciences xGnP C 500) and 0.25 g of multi-wall carbon nanotubes MWCNT (Nanocyl NC7000), 6.0 g of 15% aqueous sodium laurylsulphate solution were added to 240 ml of water in a 1 l jacketed reactor with stirrer and condenser, and dispersed at 6000 rpm (for brief periods also 12 000 rpm) with an Ultra Turrax for 15 min. Subsequently, a further 6.0 g of aqueous sodium laurylsulphate solution, 45.0 g of TAA-ol-MA, 0.225 g of 2-ethylhexyl thioglycolate and 0.45 g of triethylene glycol dimethacrylate were added and the mixture was heated further to 65° C. under vigorous shear. Once the TAA-ol-MA had melted, the mixture was dispersed with the Ultra Turrax for a further 15 min, before being cooled gradually under Ultra Turrax shear over the course of 30 minutes. At 40° C., 0.45 g of ammonium peroxodisulphate was then added for polymerization and reaction was effected over the course of 2 hours. Subsequently, reaction was continued at 45° C. overnight and then the polymerization was completed at 65° C. over the course of 1 h. During the cooling phase to room temperature, compressed air was passed through the mixture for 30 minutes, which was concentrated to a quarter of the volume. The particles were then swollen by addition of 90 ml of methanol. This was followed by the addition of 2 g of sodium tungstate dihydrate and 0.5 g of EDTA to catalyse the oxidation. The oxidation was then effected by the addition, in portions, of 3×6.8 g of 30% aqueous hydrogen peroxide solution at half-hourly intervals and then, after a further 1.5 hours, a further addition of 20.4 g of hydrogen peroxide solution. The mixture was stirred overnight and then, after another addition of 20.4 g of hydrogen peroxide, for a further 72 hours. At the end, the mixture was heated once again to 40° C. and 45° C. for 1 hour each. After cooling, the reaction solids were filtered off, washed with water and dried in a vacuum drying cabinet.

A homogeneous powder and caking and coagulates of <3% in the reactor were obtained.

The invention claimed is:
1. Process A process for polymerizing a compound of the structural formula (I)

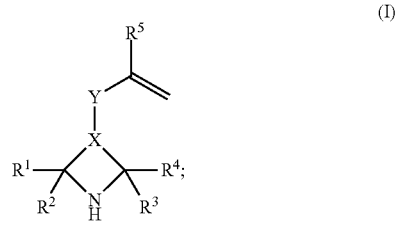

(I)

wherein $R^1$, $R^2$, $R^3$, $R^4$, $R^5$ are selected from the group consisting of hydrogen, and branched or unbranched alkyl group having 1 to 4 carbon atoms, X is selected from the group consisting of *—$CH_2$—C'H—$CH_2$—**, *—C'H—$CH_2$—**, and *—C'=CH—**, wherein "*" in each case denotes the bond to the carbon atom bonded to $R^1$ and $R^2$, wherein "**" in each case denotes the bond to the carbon atom bonded to $R^3$ and $R^4$, wherein "C'" denotes a carbon atom additionally bonded to the Y radical, wherein Y is selected from the bridging radicals (II) and (III), wherein (II) has the structure &—$(Y^1)_{p1}$—$[C=X^1]_{p2}$—$(Y^2)_{p3}$—B—$(Y^3)_{p6}$—$[C=X^2]_{p5}$—$(Y^4)_{p4}$—&&, and wherein (III) has the structure &—$(Y^5)_{p9}$-$(C=X^3)_{p8}$—$(Y^6)_{p7}$—&&, wherein, in the bridging radicals (II) and (III), p1, p2, p3 are each 0 or 1, with the proviso that it is not simultaneously the case that p1=p3=1 and p2=0, p4, p5, p6 are each 0 or 1, with the proviso that it is not simultaneously the case that p4=p6=1 and p5=0, p7, p8, p9 are each 0 or 1, with the proviso that it is not simultaneously the case that p7=p9=1 and p8=0, $X^1$, $X^2$, $X^3$ are independently selected from the group consisting of oxygen, and sulphur, $Y^1$, $Y^2$, $Y^3$, $Y^4$, $Y^5$, $Y^6$ are independently selected from the group consisting of O, S, NH, and N-alkyl, B is a divalent (hetero) aromatic radical or a divalent aliphatic radical optionally substituted by at least one group selected from the group consisting of nitro group, —$NH_2$, —CN, —SH, —OH, and halogen, and optionally having at least one group selected from the group consisting of ether, thioether, amino ether, carbonyl group, carboxylic ester group, carboxamide group, sulphonic ester group, and phosphoric ester, and wherein "&&" for Y denotes the bond via which Y is joined to X and wherein "&" for Y denotes the bond via which Y is joined to the carbon atom joined to $R^5$, comprising the following successive steps:

(a) producing a dispersion D of solid particles of the compound of the structural formula (I) in an aqueous phase, and (b) polymerizing the solid particles of the compound of the structural formula (I) of the dispersion D obtained in step (a), giving a polymer $P^1$ comprising repeat units of the structural formula (VI)

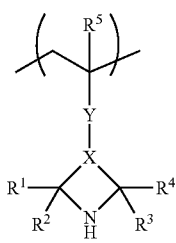

(VI)

wherein the polymerization in step (b) is conducted at a temperature below the melting temperature of the compound of the structural formula (I) used.

2. The process according to claim 1, wherein the number of repeat units (VI) in the polymer $P^1$ is 4 to 1 million.

3. The process according to claim 1, wherein the compound of the structural formula (I) used is at least a compound selected from the group consisting of the structural formulae (IV), (IV)', and (IV)":

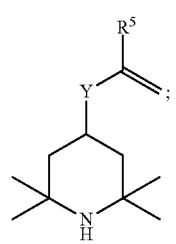

(IV)

-continued

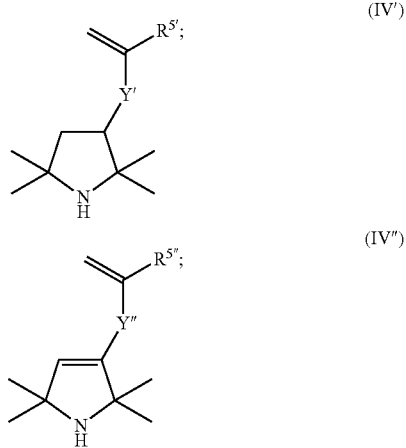

wherein, in the structural formulae (IV), (IV)', (IV)", the R⁵, R⁵', R⁵" radicals are each independently methyl or hydrogen, and wherein, in the structural formulae (IV), (IV)', (IV)", the Y, Y', Y" radicals are independently selected from the bridging radicals (II) and (III) with the definitions given in claim 1.

4. The process according to claim 1, wherein the compound of the structural formula (I) used is a compound of the structural formula (IV).

5. Process according to claim 4, wherein the compound of the structural formula (I) is the structure (V)

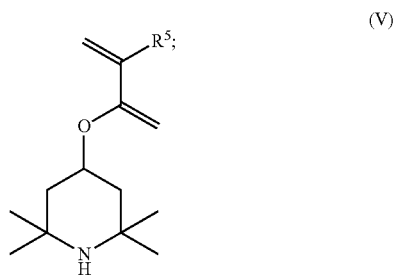

wherein R⁵=H or methyl.

6. The process according to claim 1, wherein the proportion of water in the aqueous phase is >50.0% by weight, based on the total weight of the aqueous phase.

7. The process according to claim 1, wherein the dispersion D is produced in step (a) by dispersing a mixture of the compound of the structural formula (I) and the aqueous phase at a temperature $T_{A1}$, wherein $T_{A1} > T_{SMI}$, wherein $T_{AMI}$ is the melting temperature of the compound of the structural formula (I) used, and, after the dispersion, the temperature is lowered from $T_{A1}$ to $T_{A2}$, and wherein $T_{A2} < T_{SMI}$.

8. The process according to claim 1, wherein at least 50% of the solid particles of the compound of the structural formula (I) used in the dispersion D have a particle size of ≤800 μm, determined by the method described in DIN 66156-2, using sieves according to DIN ISO 3310.

9. The process according to claim 8, wherein, at the same time, at least 80% of the solid particles of the compound of the structural formula (I) used in the dispersion that have a particle size of ≤800 μm have a particle size between 32 and 400 μm.

10. The process according to claim 1, wherein the aqueous phase in the dispersion D comprises at least one constituent selected from the group consisting of crosslinkers, surfactants, and chain transfer agents.

11. The process according to claim 1, wherein the aqueous phase in the dispersion D does not include any organic solvent.

12. The process according to claim 1, wherein the polymerization in step (b) is conducted at a temperature 1° C. or more below the melting temperature of the compound of the structural formula (I) used.

13. The process according to claim 1, wherein the polymerization in step (b) is a free-radical polymerization.

14. The process according to claim 1, wherein the polymerization initiator is added to the dispersion D obtained in step (a) after the temperature of the dispersion D obtained in step (a) has dropped below the melting point of the compound of the structural formula (I) used.

15. The process according to claim 1, wherein the temperature of the dispersion D in step (b) is below the melting temperature of the compound of the structural formula (I) used until at least 30% of the compound of the structural formula (I) used has reacted in step (a).

16. The process according to claim 1, wherein the polymer P¹ obtained in step (b), after step (b), is subjected to a nitroxidation, giving a polymer P² comprising repeat units of the structural formula (VII)

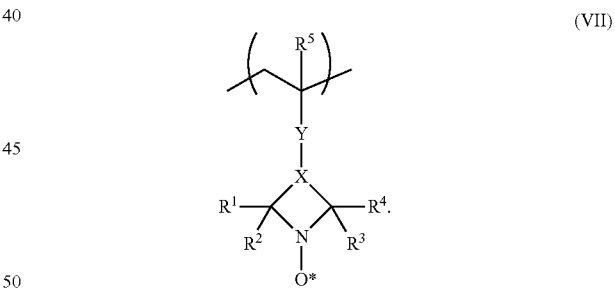

17. A redox-active electrode material for electrical charge storage, comprising: the polymer P² according to claim 16.

18. An electrode slurry for electrical charge storage, comprising: the polymer P² according to claim 16.

* * * * *